E. RETZLAFF.
VEHICLE WHEEL.
APPLICATION FILED JUNE 23, 1914.
1,134,011.
Patented Mar. 30, 1915.
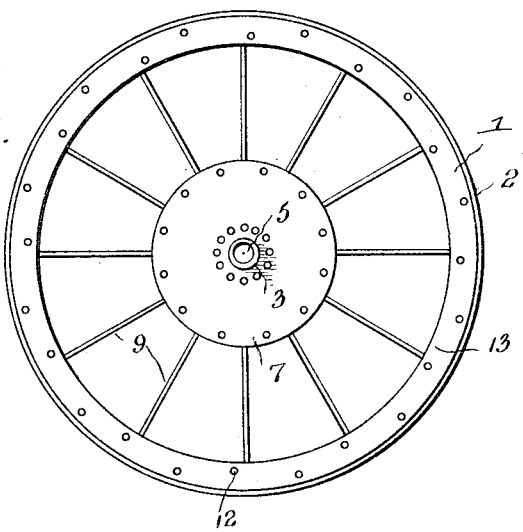
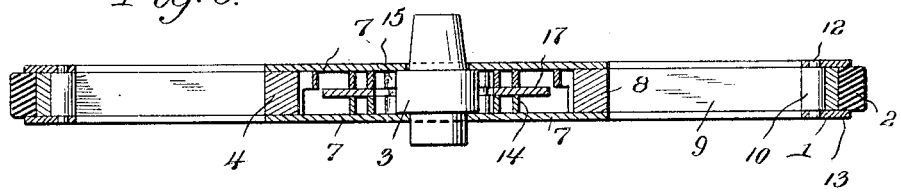
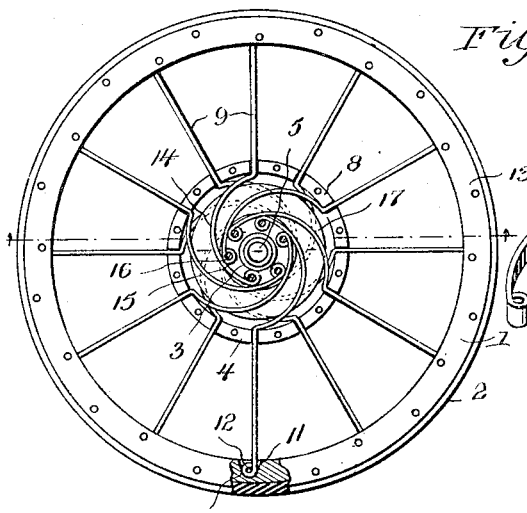
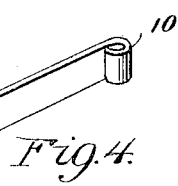
E. Retzlaff, Inventor
Witnesses
W. R. Smith
P. M. Smith
By Victor J. Evans
Attorney

UNITED STATES PATENT OFFICE.

EMIL RETZLAFF, OF HOFFMAN, MINNESOTA.

VEHICLE-WHEEL.

1,134,011.  Specification of Letters Patent.  Patented Mar. 30, 1915.

Application filed June 23, 1914. Serial No. 846,843.

*To all whom it may concern:*

Be it known that I, EMIL RETZLAFF, a citizen of the United States, residing at Hoffman, in the county of Grant and State of Minnesota, have invented new and useful Improvements in Vehicle-Wheels, of which the following is a specification.

This invention relates to vehicle wheels, the object in view being to produce a resilient wheel of such construction as to dispense with the use of the ordinary pneumatic tire and the troubles incident to the use thereof, the construction of the wheel enabling all road shocks to be absorbed by the wheel itself, said wheel embodying novel cushioning means between the felly and hub.

With the above and other objects in view, the invention consists in the novel construction, combination and arrangement of parts, as will be hereinafter more fully described, illustrated and claimed.

In the accompanying drawings:—Figure 1 is a side elevation of a vehicle wheel embodying the present invention, the hub being partly broken away. Fig. 2 is an enlarged side elevation of the hub with the adjacent hub plate removed. Fig. 3 is a diametrical section through the same. Fig. 4 is a detail perspective view of one of the spokes.

Referring to the drawings 1 designates the felly of the wheel to which a tire 2 is shown applied. This tire may be solid or of any other type and of any suitable material.

In carrying out the present invention I provide a hub comprising inner and outer sections 3 and 4, respectively, the inner section 3 being provided with an opening 5 to receive an axle or spindle 6. Secured to opposite sides of the inner hub member 3 and bearing a fixed relation thereto are oppositely arranged disk shaped hub plates 7, said hub plates being also fastened fixedly to the outer hub member 4 which is shown as comprising a circular series of outer hub segments 8 between which the spokes are adapted to slide.

The spokes 9 are arranged in a circular series and connected at their outer ends to the felly and at their inner ends to the inner hub section 3. Each spoke is preferably connected to the felly 1 by providing said spoke at its outer end with a sleeve or knuckle 10 which is seated in a recess 11 in the inner face of the felly and held therein by a pin 12 which passes through the sleeve or knuckle 10 and through annular side facing plates 13 fastened to opposite sides of the felly 1, the latter being preferably of wood for the sake of lightness. The connection referred to between the outer end of each spoke and the felly forms a pivotal joint which adds to the flexibility of the spoke at the point where it connects with the felly.

In the preferred embodiment of the invention, the outer portion of each spoke 9 between the felly and the outer hub section 4 is approximately of the same width as the felly while within the outer hub section 4, each spoke is reduced to approximately one-half width and is bent into the form of an involute curve as shown at 14 and provided at its inner extremity with a sleeve or knuckle 15 which embraces a pin 16 carried by the inner hub section 3. This forms in effect a pivotal joint between the inner extremity of each spring spoke and the inner hub section. The inner curved portions of the spokes are also arranged to extend alternately in opposite directions relatively to and around the inner hub section as shown in Fig. 2; that is to say, the inner curved ends of the spokes are so arranged that the involute curved portion of each spoke extends in the opposite direction from the corresponding curved portions of the spokes at opposite sides thereof and immediately adjacent thereto. This serves to equalize the action of the cushioning means in all directions. The outer portions of the spokes slide between the segments of the outer hub section 4 and are pressed at their opposite edges by the hub plates 7 thus imparting lateral rigidity and stiffness to the wheel to enable the same to withstand side thrusts and stresses. To prevent the involute curved portions of the springs from coming in contact with each other, a spacing plate or washer 17 is interposed between the right and left hand involute portions as shown in Fig. 3.

A wheel constructed as hereinabove described and as shown in the drawings, dispenses with the necessity of using an inflated or pneumatic tire, all of the road shocks and vibrations being absorbed by the spring spokes under the novel relative arrangement referred to.

What I claim is:—

1. In a vehicle wheel, the combination of a felly, a hub comprising inner and outer members concentric to each other and the axis of the wheel, and a circular series of spring spokes terminally attached to the felly and inner hub member and slidingly related to the outer hub member, each spoke embodying a straight radially disposed outer portion extending from the felly through the outer hub member and an inner portion described on an involute curve and embracing a part of the inner hub member, said spokes being so arranged that the involute curved portion of each spoke extends in the opposite direction from the corresponding curved portions of the spokes at opposite sides thereof and immediately adjacent thereto.

2. In a vehicle wheel, the combination of a felly, a hub comprising inner and outer members concentric to each other and the axis of the wheel, and a circular series of spring spokes terminally attached to the felly and inner hub member and slidingly related to the outer hub member, each spoke embodying a straight radially disposed outer portion extending from the felly through the outer hub member and an inner portion described on an involute curve and embracing a part of the inner hub member, said spokes having their inner curved portions reduced to approximately one-half width and being so arranged that the involute curved portion of each spoke extends in the opposite direction from the corresponding curved portions of the spokes at opposite sides thereof and immediately adjacent thereto.

In testimony whereof I affix my signature in presence of two witnesses.

EMIL RETZLAFF.

Witnesses:
WILLIAM SCHELLBACH,
NELS E. RULIEN.

Copies of this patent may be obtained for five cents each, by addressing the "Commissioner of Patents, Washington, D. C."